W. R. BILLINGS.
MEASURING FAUCET.
APPLICATION FILED OCT. 11, 1916. RENEWED APR. 10, 1918.
1,271,838.
Patented July 9, 1918.
3 SHEETS—SHEET 2.
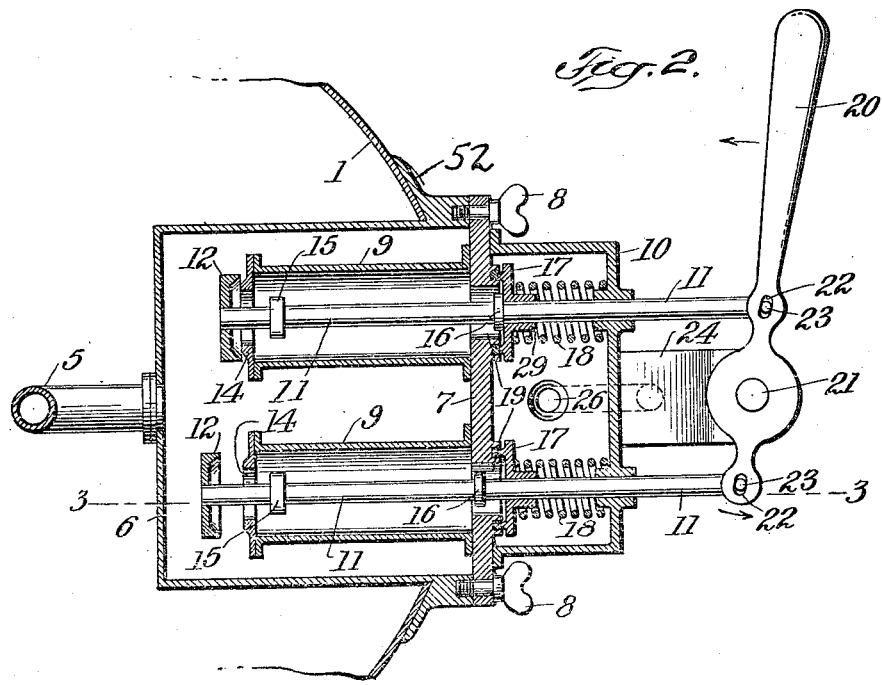
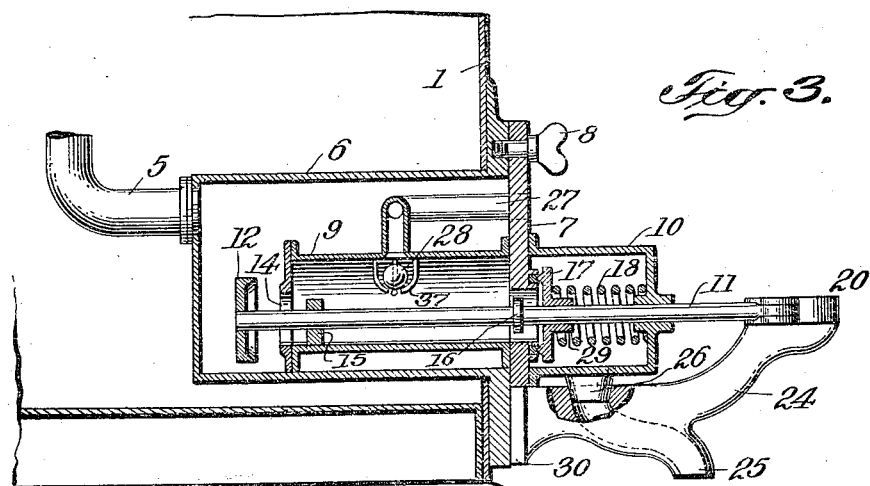

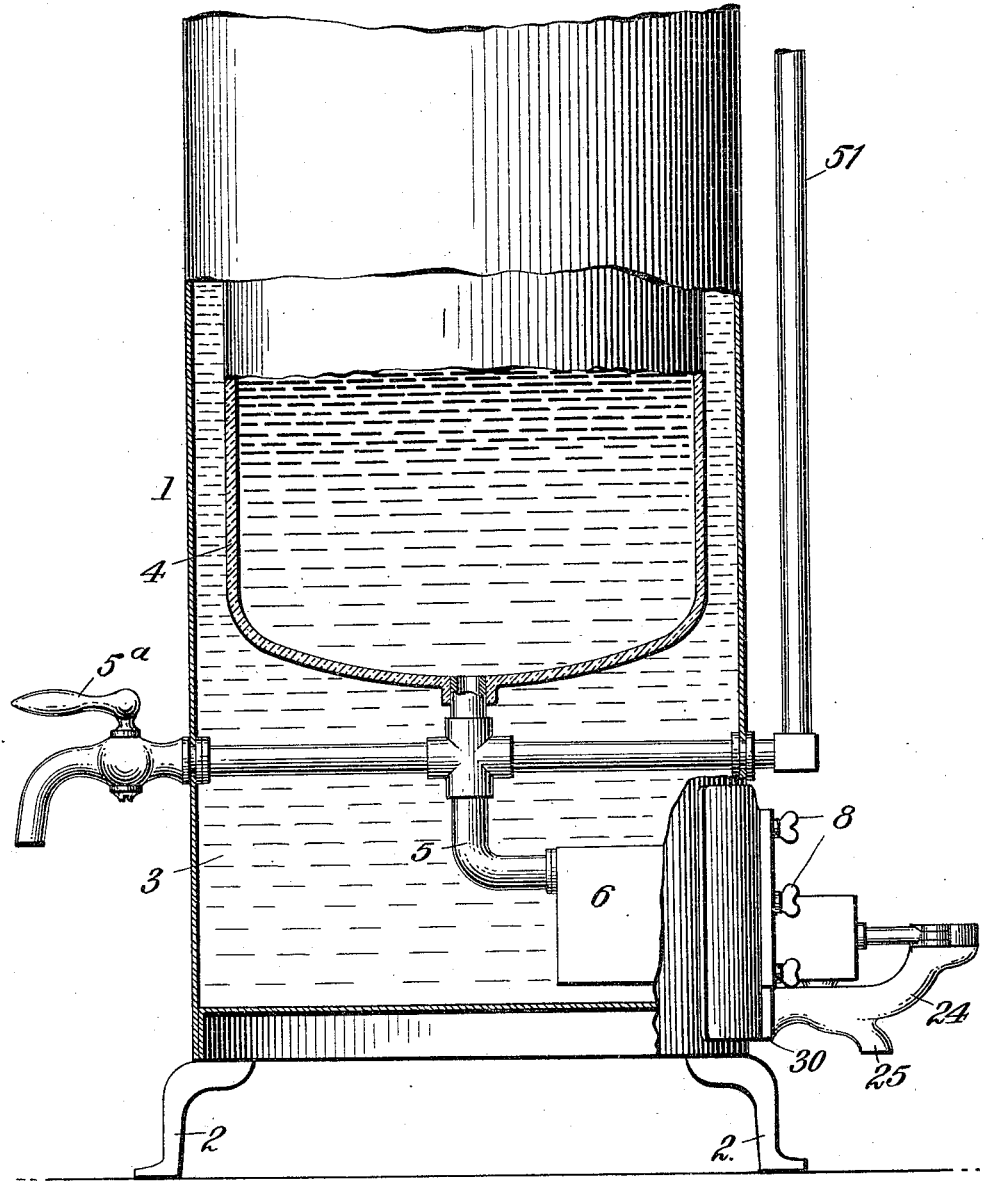

W. R. BILLINGS.
MEASURING FAUCET.
APPLICATION FILED OCT. 11, 1916. RENEWED APR. 10, 1918.
1,271,838.
Patented July 9, 1918.
3 SHEETS—SHEET 3.
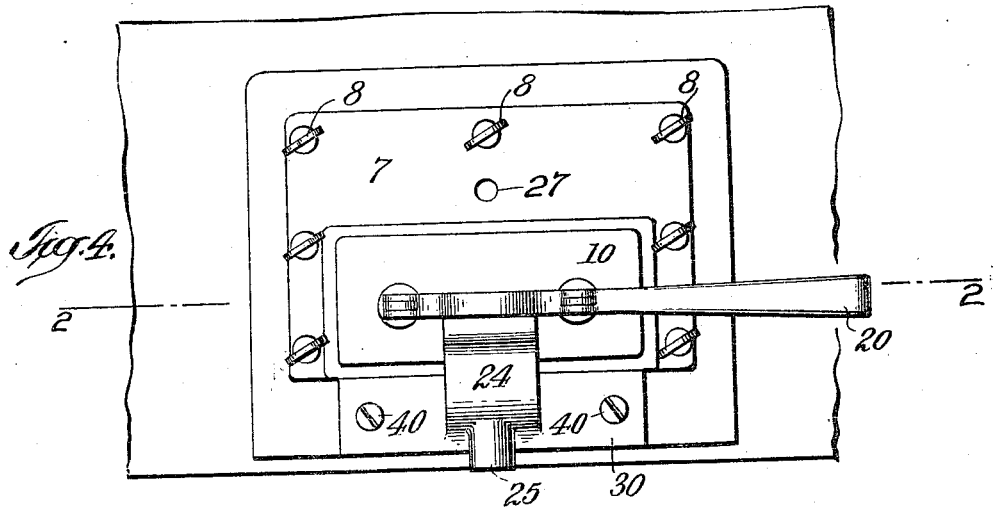
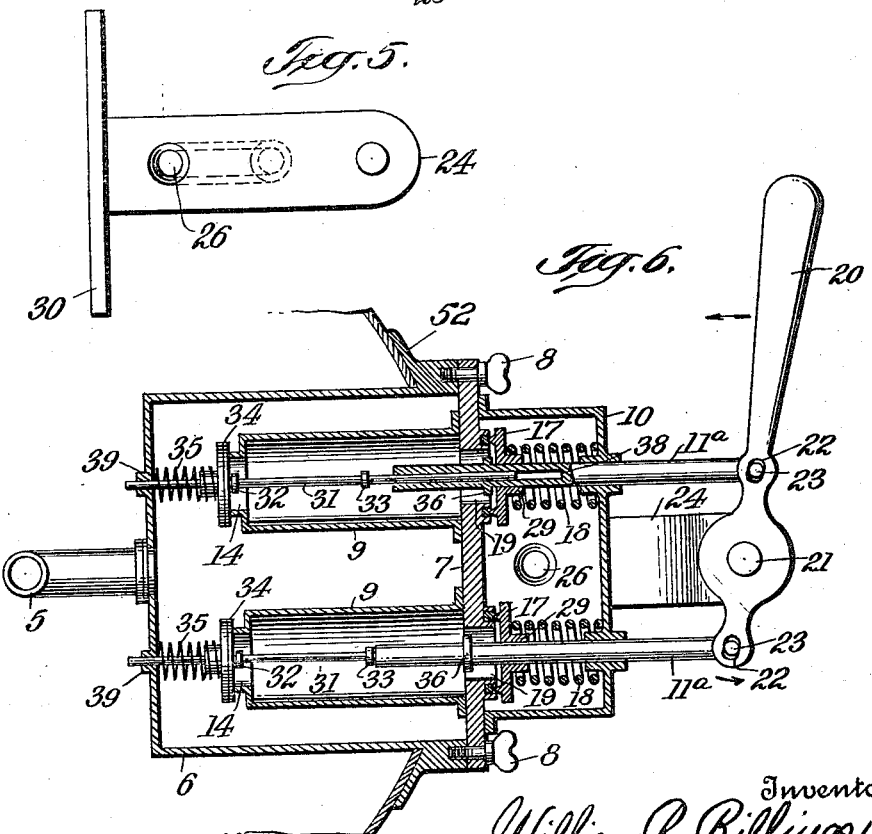
Inventor
William R. Billings
By his Attorney
Fred E. Tasker

UNITED STATES PATENT OFFICE.

WILLIAM R. BILLINGS, OF BROOKLYN, NEW YORK.

MEASURING-FAUCET.

1,271,838.   Specification of Letters Patent.   Patented July 9, 1918.

Application filed October 11, 1916, Serial No. 124,942. Renewed April 10, 1918. Serial No. 227,826.

*To all whom it may concern:*

Be it known that I, WILLIAM R. BILLINGS, a citizen of the United States, and resident of borough of Brooklyn, city of New York, in the county of Kings and State of New York, have invented certain new and useful Improvements in Measuring-Faucets, of which the following is a specification, reference being had therein to the accompanying drawing.

My invention refers to measuring faucets, or devices by the use of which a predetermined quantity of liquid or fluid may be withdrawn from a tank or storage compartment, thus enabling the measurement of the quantity to be made quickly and easily through the manipulation of the handle of the faucet and without the necessity of using graduated measuring or weighing instruments or receptacles. A leading object of the invention is to simplify and perfect devices of the class referred to so that by reason of this economical construction and efficient operation they may have a wider range of usefulness. One object among many which might be mentioned is to enable milk, coffee, tea, cocoa, and other beverages to be quickly served from an urn or tank with just the right quantity emitted from the faucet at each turn of the same to fill a cup or dish so that there may be no wastage or spilling. A similar valuable function of the invention may be subserved in drawing off premeasured amounts of heavy liquid like molasses and syrup and heavy oils, dangerous fluids such as burnable acids and inflammable oils, and in fact, any kind of fluid, liquid, or other substance, fixed amounts of which it is desired to apportion or distribute in various ways. The invention includes among many useful features, that of providing a submerged chamber which will receive and keep hot the beverage which is being dispensed, together with one or more measuring compartments located within said chamber and wholly surrounded by the liquid or beverage, so that the latter is kept at the temperature of the quantity within the tank or urn until the moment of its discharge through the faucet; also the invention comprises duplex measuring devices operated, if desired, by a single lever whereby when one is discharging the other is filling preparatory to another discharge, or whereby they may discharge one at a time, also the invention may be said to consist of a chamber containing a quantity of liquid to be measured, a removable cover attached to said chamber, a measure carried by said cover having inlet and outlet means, and a discharge chamber for receiving the contents of the measure; also there may be several valve-provided measuring chambers carried by a removable plate together with a faucet appliance for emptying said measuring chambers separately into the discharge chamber; and further the invention comprises numerous details and peculiarities in the construction, arrangement, and combination of the various parts, substantially as will be hereinafter described and then more fully pointed out in the claims.

In the accompanying drawing illustrating my invention:

Figure 1 is a vertical section in partial elevation of an urn or tank provided with my improved measuring faucet;

Fig. 2 is a horizontal section of the mechanism of the measuring faucet on the line 2, 2 of Fig. 4;

Fig. 3 is a vertical section of the same on the line 3, 3 of Fig. 2;

Fig. 4 is a side elevation;

Fig. 5 is a detail view of the discharge nozzle and bracket on which the operating lever is fulcrumed.

Fig. 6 is a horizontal sectional view similar to Fig. 2 of a modified form of the invention;

Similar characters of reference designate corresponding parts throughout the different figures of the drawing.

Simply for the purpose of easy explanation and with no desire of restricting the invention to any such special application, I have delineated in Fig. 1 the outer jacket 1 of a coffee urn supported on feet 2 and containing an inner water chamber 3 and the main coffee chamber 4, which latter communicates by a pipe 5 with a supplemental beverage chamber 6 or receiving chamber submerged within the hot water in the chamber 3 near the bottom of the latter and close to the faucet appliances, with one end contiguous to the wall of the urn 1 where said end of chamber 6 may be covered by a removable plate or man-hole cover 7 secured in position by means of a plurality of thumb screws or clamps 8 or other equivalent devices as clearly indicated in the drawing particularly in Fig. 4. It will be obvious that by loosening these screws 8 the cover 7 may be quickly removed and access had to the interior of the chamber 6, and that with equal facility the cover 7 may be replaced and reattached in position by tightening the screws 8. In Fig. 4 I show a row of screws at the top and at each side of the plate 7, but, of course, the number may vary in different constructions, as well as the position and kind and character of the screws or other attaching devices. The chamber 6 is secured to the jacket 1 by forming a saddle 52 on said chamber 6 which is riveted or otherwise tightly fastened to the jacket 1. 5ª denotes a mixing or draining faucet, and 51 a water gage or glass.

Arranged inside of the receiving or supplemental beverage compartment 6 is a number of measures or measuring chambers 9, say for example two, although there may be more if desired and they may be of the same or different sizes. In the example shown in the drawings I have shown two of them of the same size consisting of elongated cylinders carried by the removable cover 7 and lying horizontally within the chamber 6. Each one of these measuring compartments has a capacity equal to any predetermined quantity of fluid or liquid which it is desired to measure, as for example, a quantity equal to the contents of an ordinary coffee cup. In one end of each measuring chamber 9 is an inlet opening 14 provided with a seat against which a valve 12 acts, while at the opposite end of each chamber 9, the cover plate 7 is provided with an opening 19 through which the contents of the measuring chamber may empty into a discharge chamber 10 which is securely fastened to the outside face of the cover plate 7 and is carried thereby, said opening 19 being provided with a seat having a suitable packing if desired, in connection with which a valve 17 operates. Each valve 12 is securely fastened to a spindle 11 and each valve 17 is provided with a central hub 29 loose on the same spindle; further, each spindle 11 is provided with a fixed collar 16 which is adapted to strike the adjacent valve 17 and unseat it at times, which said spindle operates through a suitable boss formed in the outer wall of the discharge chamber 10 and a bearing 15 within the chamber 9 adjacent to the inlet opening 14; furthermore, each valve spindle 11 is surrounded by a coiled spring 18 which is tensioned between the valve 17 and the opposite wall of the discharge chamber 10, said spring having the function of closing the valve 17 against its seat whenever the collar 16, which acts to open the valve 17 is released therefrom and the valve is set free. The spindles 11 for the two chambers, in the present example of the invention where two chambers only are employed, are provided with pins 23 which loosely engage slots 22 in an external lever handle 20 which is fulcrumed at 21 by means of some suitable pivot pin or other appliance on a bracket 24 having a plate 30 which is securely fastened to the cover 7 below the discharge chamber 10, said bracket being shown in detail in Fig. 5 and its mode of attachment being indicated in Fig. 4. This bracket moreover carries an integral discharge nozzle or spout 25 suitably shaped and curved if desired and being engaged by a nozzle 26 carried by the floor of the discharge chamber 10, so that it will be perfectly apparent that the contents of the measuring chambers 9 will, when the valves 17 are open, discharge their contents through the openings 19 into the chamber 10, from which they will gravitate out of nozzle 26 through discharge nozzle 25 into a cup or other receptacle placed under said nozzle 25 to receive the liquid.

It will thus be seen that I provide measuring chambers which are surrounded with the hot beverage that flows into the chamber 6 through the pipe 5 from the main chamber 4, and that said auxiliary receiving chamber 6 is located within the hot water or other hot element which is in the jacket 1 and around the chamber 4. It will also be evident that whenever the valves 12 are unseated the liquid contents of the chamber 6 will flow through the openings 14 and fill the measuring chambers 9 and that the contents of these chambers will be discharged whenever the valves 17 are open. By an easy movement of the handle 20 in one direction or the other, the valves 17 may be opened one at a time and the measuring chambers may be separately emptied; but as soon as the lever 20 is released by the hand, the spring 18 belonging to the particular valve 17 that has been opened will close the latter, and this will open the valve 12 belonging to said chamber and permit the latter to be again filled. With this duplex arrangement the handle 20 is movable to the right or to the left, as shown by the arrows in Fig. 2. If we assume that the parts are in the position shown in Fig. 2, and that the handle 20 is to be moved to the left, the result will be to cause the collar 16 on the spindle in the lower part of the figure to act against its valve 17 and open it, at the same time closing the valve 12 on the same spindle upon its seat over the opening 14, and if the handle is held in this position with the valve 17 open sufficiently long, the contents of the chamber 9 will be discharged, but as soon as the handle 20 is released the spring 18 will close the valve 17, and when closed the valve 12 on the same stem will be opened enough to allow the chamber 9 to gradually fill, or in other words, the valves of the lower measuring chamber will assume a similar position to those of the upper measuring chamber in Fig. 2. It is possible, therefore, with this device to move the lever 20 in one direction and hold it there while one measuring chamber is being discharged, during which time the other will be filling, and then immediately shift it in the opposite direction and discharge the other measuring chamber, the chambers being successively filled and discharged during the alternate vibrations of the lever 20; it being evident moreover that if only a single discharge of one chamber is effected and then the handle 20 is released, both springs 18 will when the parts are all at rest act to close both of the valves 17, which will result in leaving both of the valves 12 open, one perhaps less than the other but still wide enough to allow the filling of the chambers 9, and as these chambers are surrounded by the hot liquid at all times, the contents will be kept in condition for instant withdrawal for use, the same being effected as stated by laying hold of the lever 20.

Each of the measuring chambers 9 is necessarily provided with some air venting means, and as a convenient example of same I utilize a pipe 27 running out to the top of each chamber 9 and leading to the atmosphere through the wall of the chamber 6, as for example, through the cover 7 at any convenient point, a ball valve 28 held loosely within a cage 37 (see Fig. 3), serving to prevent the liquid from passing out through the pipe 27.

In Fig. 6 I have shown a modification of the invention wherein the valves and their stems are somewhat differently arranged so as to operate in a somewhat different way. Here I still employ valves 17 operating to open and close the openings 19, said valves 17 having central bosses 29 and having arranged therewith closing springs 18 which are tensioned between the valves 17 and the opposite side of the discharge chamber 10. Instead of having long valve stems 11 for both the outlet valves 17 and the inlet valves at the other end of the chambers 9, I employ valve stems 11ª which are loosely connected to the lever 20 by pins 23 and slots 22, and these stems 11ª have therein longitudinal passages 38 running for a certain distance, in which passages are smaller stems 31 that lead through the openings 14 in the other ends of the chambers 9 and are supported in bearings 39 in the rear wall of the chamber 6, said smaller stems carrying valves 34 which open and close the passages 14 and serve as inlet valves, there being springs 35 tensioned between said valves 34 and the opposite wall of the chamber 6. The valves 34 are loosely placed on the stems 31 and said stems have thereon fixed collars 32 and 33 spaced apart for a certain distance, the collars 33 being nearest to the end of the stem 11ª and adapted to be struck thereby, while the collars 32 are nearest to the valves 34 and adapted to strike the same for the purpose of unseating the valve. The valve stems 11ª are provided with collars 36 similar to the collars 16 in Figs. 2 and 3. It will thus be seen that the springs 35 serve to keep the inlet openings 14 closed at all times except when the collars 32 strike against the valves 34 which they do only when the stems 11ª under the action of the lever 20 strike against the collars 33 and reciprocate the stems 31. If then the user of the device desires to open one of the valves 34 so that the measuring chamber 9 may fill with liquid, the lever 20 will be moved in the proper direction to drive one of the stems 11ª inwardly far enough so that it will contact with a collar 33 and thus will drive stem 31 so that collar 32 will act against valve 34 and open it, and if the parts are held in this position a proper length of time the measuring chamber will be filled. When a measuring chamber is to be opened for the discharge of the fluid through opening 19 into the discharge chamber 10 and out through the faucet 25 the lever 20 will be manipulated so as to bring the collar 36 against the valve 17 long enough to open said valve and allow the fluid to pass out, after which if the lever 20 is released the spring 18 will close the said valve 17 when the parts are all at rest; therefore, the valves 17 will both remain closed and likewise the valves 34 will both remain closed, all being under the tension of their respective closing springs, except when the lever 20 is operated and the filling of a measuring chamber takes place only when the lever is manipulated to overcome the tension of one or the other of the closing springs for the inlet valves, and allow the filling of one simultaneously with the discharge from the other chamber. This is found to be a preferable arrangement for many purposes and many kinds of tanks and I have illustrated it here in order that my invention may be more fully understood. The filling of one chamber must be simultaneous with the emptying of the other, and vice versa.

It will be observed that the cover 7 for the receiving chamber 6 permits access to the interior of said chamber for the purpose of cleaning it and keeping it in excellent condition at all times, inasmuch as said cover 7 carries the measuring chambers and the discharge chambers together with the valve mechanism and operating lever entirely supported thereon. By simply removing the clamping screws 8 the whole operative mechanism may, therefore, be immediately detached from the urn and exposed so that its various parts can be readily cleaned, since every detail is made promptly accessible. I have, therefore, provided an important structural improvement in furnishing a cover similar to a man-hole cover having thereon a plurality of measures or measuring chambers, and also a common discharge member which receives the liquid from the measuring chambers, and allows it to pass out through the faucet. The connection of the discharge chamber by a conical nozzle 26 with the bracket having the discharge nozzle 25 is an important feature because it is so easily connected or disconnected, especially as this bracket is secured by its back plate 30 to the main frame below the cover 7, the securing of the plate 30 being by means of a pair of screws or other devices, as shown at 40 in Fig. 4.

Many changes may be made in the construction and relative arrangement of the various parts, also in the increase or diminution of the number of chambers, valves, etc., and the variation in their respective and relative size, as well as in the lever mechanism for operating them and the various connections, without departing from my invention, and it will be noted that if desired mechanism may be provided in connection with the hub of the lever bracket similar to mechanism employed in electric snap switches to lock the handle in its extreme position and other positions if desired, or any other kind of a device for limiting the movement of the operating lever and deciding on the correct position thereof for performing its different functions may be devised and applied for use in connection therewith.

Having thus described my invention, what I claim as new and desire to secure by Letters Patent, is:—

1. In a measuring faucet, the combination of a main chamber for the liquid or substance being dispensed, a water chamber, a supplemental receiving chamber communicating with the main chamber, a submerged measure in the latter chamber, means for emptying said measure, and a removable discharge chamber for receiving the contents of the measure.

2. In a measuring device for liquids and the like, the combination of a main chamber containing the liquid to be measured, a supplemental receiving chamber at a distance therefrom and communicating therewith, a submerged measure in the latter chamber, means for filling and emptying said measure, and a removable discharge chamber for receiving the contents of the measure.

3. In a measuring device, the combination of a beverage urn, a hot water chamber below the same, a submerged receiving chamber in the latter chamber and communicating with the main chamber, one or more valve-provided measuring chambers submerged within said receiving chamber, and a faucet appliance for emptying said measuring chambers separately.

4. In a measuring device, the combination of a liquid container, a hot water chamber below the same, a submerged receiving chamber in the latter chamber and communicating with the liquid container, one or more valve-provided measuring chambers submerged within said receiving chamber, a lever mechanism for the aforesaid valves, and a faucet appliance for emptying said measuring chambers separately.

5. In a measuring faucet, the combination of a main chamber, a supplemental chamber communicating therewtih, a cover for said chamber, one or more measures carried by said cover, a common discharge chamber on said cover receiving the contents of the measures, and valve mechanism for controlling the inlet and outlet of the measures, said cover, measures, and discharge chamber being all associated together as a single removable unit.

6. In a measuring faucet, the combination of a main beverage chamber, a hot water chamber, a supplemental receiving chamber communicating with the main chamber and located in the hot water chamber, a cover for said receiving chamber, a plurality of measuring chambers carried by said cover and removable therewith, inlet and outlet valves for said measuring chambers, and means for operating said valves so that the chambers may discharge separately.

7. In a measuring faucet, the combination of a main beverage chamber, a hot water chamber, a supplemental receiving chamber communicating with the main chamber, a cover for said chamber, measuring chambers supported by said cover, a common discharge chamber likewise on said cover and receiving the contents of the measuring chamber, inlet and outlet valves for said measuring chambers, and a leverage mechanism for operating said valves.

8. In a measuring device for liquids and the like, the combination of a main chamber, a water chamber surrounding it, an auxiliary receiving chamber in said water chamber and communicating with the main chamber, a plurality of measuring chambers in the latter chamber, inlet and outlet devices for the measuring chambers, automatic means for closing the outlet valves separately, and leverage devices for actuating all the valves so that the measuring chambers may be discharged independently.

9. In a measuring device for liquids and fluids, the combination of a main beverage chamber, a hot water chamber, an auxiliary receiving chamber communicating with the main chamber, a cover therefor, means for securing it detachably in place, measuring chambers in said receiving chamber and attached to the cover, a common discharge chamber on said cover receiving the contents of the measuring chambers, inlet and outlet valves for the measuring chambers, means for jointly operating them including a lever handle, a discharge faucet, and means for connecting it loosely with an outlet nozzle in the discharge chamber.

10. The combination of a chamber adapted to receive a quantity of liquid or fluid, a cover therefor, means for securing it in position, a series of measures on said cover, the same being open at each end and provided at one end with an inlet valve and at the other with an outlet valve, a common discharge likewise carried by the cover so that said discharge, cover, and the measures may be associated together in a unitary combination, and means for automatically closing the outlet valves.

11. The combination with a chamber for containing a quantity of liquid or fluid to be measured, of a removable cover, measuring chambers attached thereto and having inlet and outlet means, a discharge chamber for receiving the contents of the measuring chambers, a single discharge nozzle in communication with the said discharge chamber, and means for controlling the inlet and outlet means for the measuring chambers.

12. The combination with a chamber for containing a quantity of liquid or fluid to be measured, of a removable cover, a measure attached thereto and having inlet and outlet means, and a discharge chamber for receiving the contents of the measure.

13. The combination with a chamber for containing a quantity of liquid or fluid to be measured, of a removable cover, a measure attached thereto and having inlet and outlet means, a discharge chamber for receiving the contents of the measure and delivering it as desired, and means for controlling the inlet and outlet means for the measure, said means being located partially within the discharge chamber.

14. In a measuring faucet, the combination of a chamber for containing a quantity of liquid or fluid to be measured, a removable cover for said chamber, a measure supported by said cover, a discharge chamber likewise supported on said cover and receiving the contents of the measure, inlet and outlet valves for said measure, and a leverage mechanism for operating said valves.

15. The combination with a chamber for containing a quantity to be measured, of a measure, removable means on the chamber for carrying said measure, inlet and outlet means for the measure, a discharge chamber for receiving the contents of the measure, means for delivering said contents from the discharge chamber, means for controlling the inlet and outlet means for the measure, the same being located partially within the discharge chamber and having an external operating handle.

16. In a measuring device, the combination of a main chamber, a hot water chamber below the same, a submerged receiving chamber in the latter chamber communicating with the main chamber, one or more valve-provided measuring chambers submerged within said receiving chamber and carried by a removable plate and a faucet appliance for emptying said measuring chambers separately.

17. In a measuring device, the combination of a liquid container, a hot water chamber below the same, a submerged receiving chamber in the latter chamber, and communicating with the liquid container, one or more measures in said receiving chamber and carried by a cover removably attached at the outer end of the receiving chamber, a discharge chamber contiguous to said measures, inlet and outlet valves for each measure, and means for operating said valves so as to empty the measures separately.

In testimony whereof I hereunto affix my signature.

WILLIAM R. BILLINGS.

Copies of this patent may be obtained for five cents each, by addressing the "Commissioner of Patents, Washington, D. C."